Jan. 6, 1953     S. L. ARENSBERG     2,624,214
REVERSIBLE DRIVE MECHANISM
Filed Oct. 27, 1950     2 SHEETS—SHEET 1
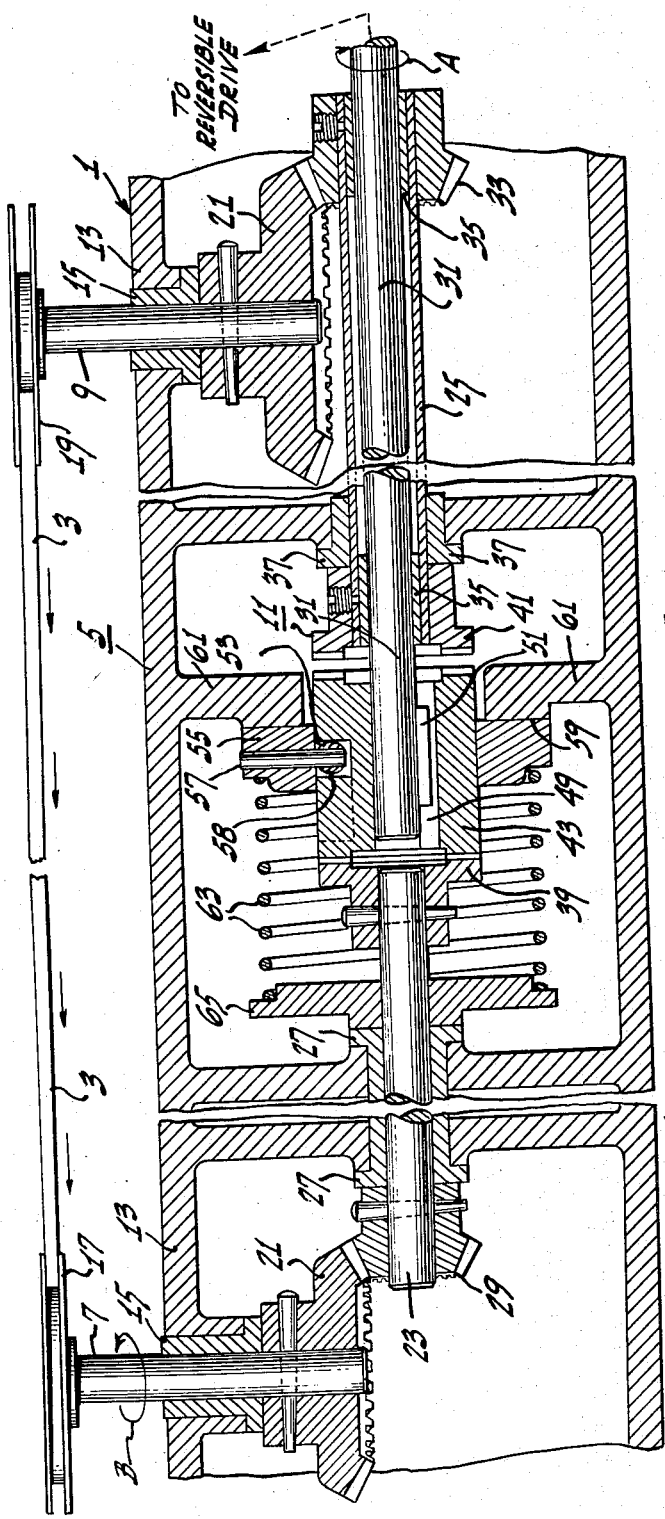
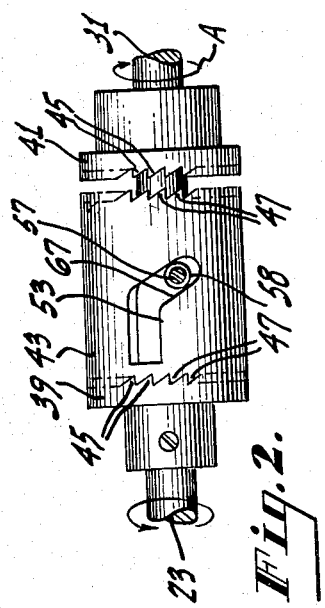
INVENTOR
STEWART L. ARENSBERG
BY
ATTORNEY

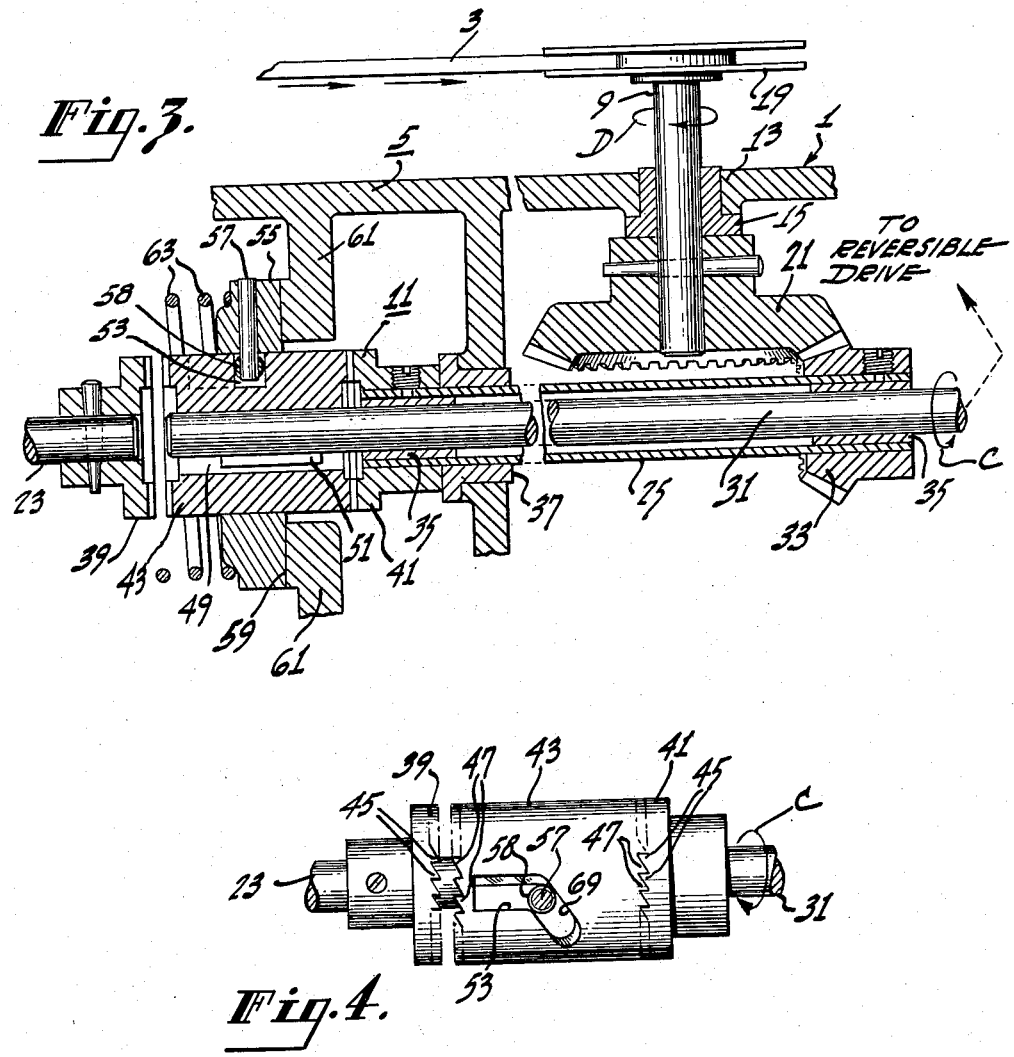

Patented Jan. 6, 1953

2,624,214

UNITED STATES PATENT OFFICE 2,624,214

REVERSIBLE DRIVE MECHANISM

Stewart L. Arensberg, Collingswood, N. J., assignor to Radio Corporation of America, a corporation of Delaware Application October 27, 1950, Serial No. 192,538

2 Claims. (Cl. 74—665)

The present invention relates to a reversible drive mechanism for two independently rotatable members, and more particularly to an improved clutch assembly therefor.

Apparatus for examining portions of a tape, chart, film or other flexible member wound or stored upon a reel, such as that employed in editing machines for motion picture film, magnetic recording tape or wire, or the like, usually provide an arrangement whereby the tape or film can be transferred at will from the storage reel to another reel, also referred to herein as the take-up reel. In such apparatus, the two reels are usually mounted for independent rotation about separate axes and are connected respectively to a reversible drive mechanism. Since the reels will not always rotate at the same speed, the apparatus may be arranged to connect only the take-up reel to the source of driving power, while the storage reel is allowed to rotate freely. A clutch assembly is usually provided for this purpose so that an operator can selectively couple either one of the reels to the source of driving power and disconnect the other reel. Particular advantage is found in providing an arrangement whereby the clutch assembly is automatically operative in response to the change in direction of rotation of the reversible drive mechanism.

A primary object of the present invention, therefore, is to provide an improved clutch assembly for a reversible drive mechanism for two independently rotatable members.

Another object of the present invention is to provide a clutch assembly for a reversible drive mechanism which is automatically responsive to a change in direction of rotation of the drive mechanism.

Still another object of the present invention is to provide a clutch assembly for selectively coupling one of two independently rotatable members to a reversible drive mechanism while at the same time permitting the other member to be free to rotate.

A further object of the present invention is to provide an improved clutch assembly for a reversible drive mechanism which is simple in construction, highly efficient in use and positive in operation.

The present invention comprises an apparatus which includes means automatically responsive to a change in direction of rotation of a reversible drive mechanism to connect one or the other of two independently rotatable members to the drive mechanism.

The novel features characteristic of the present invention, as well as additional objects and advantages thereof, will be better understood from the following detailed description when read in connection with the accompanying drawings in which:

Figure 1 is a front elevation, in section, of a preferred embodiment of the present invention, a portion of the housing being broken away and showing the clutch assembly in position to drive the rotatable member shown at the left of the apparatus, Figure 2 is a plan view of the sliding coupling member in the position shown in Figure 1, Figure 3 is a fragmentary view, similar to Figure 1, showing the clutch assembly in position to drive the rotatable member shown at the right of the apparatus, and Figure 4 is a plan view, similar to Figure 2, of the sliding coupling member in the position shown in Figure 3.

Referring more particularly to the drawing wherein similar reference characters designate corresponding parts throughout, there is shown a drive mechanism or apparatus 1 for transferring a tape, film or other flexible material 3, wound upon one of two independently rotatable members, to the other member. The apparatus 1 comprises generally a housing or other suitable support 5 on which two shafts 7, 9 are mounted in spaced apart relation for independent rotation about axes parallel to each other, the shafts being selectively coupled to a reversible drive (not shown) by a clutch assembly 11 also carried by the housing.

The rotatable shafts 7, 9 comprise driven members which extend through a wall 13 of the housing 5 and are journaled intermediate their ends in bearings 15 mounted in the housing wall. Spools or reels 17, 19 are mounted on the ends of the shafts 7, 9 externally of the housing 5 and comprise storage and take-up reels for the tape or film 3. Bevel gears 21 are secured to the other ends of the shafts 7, 9 located within the housing 5.

Each of the reel shafts 7, 9 is driven independently by another driven member 23, 25. The driven member 23 for the reel shaft 7, shown at the left of the apparatus in Figure 1, comprises a shaft journaled intermediate its ends in two bearings 27 supported within the housing 5. The driven shaft 23 has a bevel gear 29 secured to one end thereof and is mounted with its axis normal to the axis of the reel shaft 7 and with its bevel gear 29 in mesh with the reel shaft bevel gear 21.

A drive shaft 31 is mounted within the housing 5 with its axis in alignment with the axis of the driven shaft 23. The driven member 25 for the other reel shaft 9 comprises a cylindrical sleeve having a bevel gear 33 secured to one of its ends. The drive shaft 31 extends coaxially through the sleeve member 25, and is supported in spaced relation to the drive shaft by two bearings 35 which are disposed between the drive shaft 31 and the sleeve member 25 adjacent the ends of the latter. The bearings 35 permit the drive shaft and sleeve to rotate independently. Like the driven member 23 for the reel shaft 7 shown at the left of the apparatus, the sleeve 25 and drive shaft 31 are disposed with their common axes normal to the other reel shaft 9, shown at the right of the apparatus in Figure 1, and with the sleeve bevel gear 33 in mesh with the bevel gear 21 secured on the other reel shaft 9.

The sleeve member 25 and the drive shaft 31 are journaled in two bearings 37 supported within the housing 5 (only one bearing being shown in the drawings). One of the bearings 37 is arranged to engage the sleeve member 25 adjacent the end remote from the bevel gear 33. The other bearing (not shown) is arranged to engage the drive shaft 31 at a point beyond the end of the sleeve to which the bevel gear 33 is secured and may comprise a thrust bearing to prevent movement of the drive shaft in axial directions. Thus, the two reel shafts 7, 9 are mounted for independent rotation.

The clutch assembly 11 which connects either one of the reel shafts 7, 9 to the drive shaft 31 comprises two clutch plates 39, 41 attached respectively to the driven shaft 23 and sleeve member 25, and a slidable coupling member 43 carried by the drive shaft 31 and adapted to engage either one of the clutch plates 39, 41 for rotation of the reel shafts 7, 9 and the reels 17, 19. Each of the clutch plates 39, 41 is provided with a plurality of radially disposed teeth or cogs 45 arranged in circumferential spaced array on one side or face thereof. The clutch plates 39, 41 are secured to the ends of the driven members 23, 25 opposite the ends to which the bevel gears 29, 33 are attached and are disposed with their toothed surfaces facing each other.

The slidable coupling member 43 comprises a sleeve having a plurality of radially disposed teeth or cogs 47 arranged in circumferential spaced relation on opposite ends thereof. The slidable coupling member 43 is mounted on the drive shaft 31 between the two clutch plates 39, 41. The coupling member 43 is provided with a longitudinal slot 49 on the inner surface thereof. A key 51 seated in the drive shaft is disposed within the slot 49 to secure the coupling member 43 to the shaft 31 for rotation therewith and yet permit the coupling member to slide freely in axial directions longitudinally of the drive shaft. The clutch plates 39, 41 and the sliding coupling member 43 are coaxially aligned and disposed in spaced apart relation to an extent such that the sliding coupling member will mesh with only one of the two clutch plates at a time. The teeth 45, 47 disposed on the clutch plates 39, 41 and the coupling member 43 are of ratchet type so that they will provide a one-way drive for the respective driven members 23, 25.

In order to selectively drive one of the reel shafts 7, 9 at a time, the sliding coupling member 43 is arranged to mesh with one or the other of the clutch plates 39, 41 in response to a change in direction of rotation of the drive shaft 31.

The selective driving means includes a diagonal slot 53 in the outer surface of the slidable coupling member. An annular member or collar 55 having a stud 57 projecting radially inwardly therefrom is mounted on the coupling member 43 with one end of the stud disposed in the diagonal slot 53. A roller 58 is provided on the end of the stud 57 disposed within the slot 53 to minimize frictional restraint between the stud and the coupling member. The collar 55 is independently rotatable with respect to the coupling member 43 to an extent limited by movement of the stud 57 in the slot 53. The collar 55 is biased into engagement with a stationary wall surface 59 provided by a partition 61 in the housing 5. A coil spring 63 is provided for biasing the collar 55 into contact with the wall surface 59. The spring 63 is disposed around the coupling member 43 in spaced relation thereto and is compressed between the collar 55 and another collar 65 mounted for independent rotation on the driven shaft 23 between the clutch plate 39 and the bearing 27 adjacent thereto.

The drive mechanism 1 of the present invention will be found to operate in the following manner. Regardless of the direction of rotation of the driven shaft 31, the slidable coupling member 43 will rotate simultaneously therewith. As soon as the driven shaft 31 is rotated, the collar 55 and stud 57 mounted on the coupling member 43 will be held stationary momentarily by reason of the frictional contact between the collar and the stationary wall surface 59. The tendency of the stud 57 to remain stationary will cause the cam surface of the coupling member 43 provided by the diagonal slot 53 to bear against the stud and move the coupling member longitudinally on the drive shaft into engagement with one or the other of the clutch plates 39, 41 depending upon the particular direction of rotation of the drive shaft.

As seen particularly in Figure 1 of the drawing, the apparatus illustrates the position of the parts when the drive shaft 31 is rotated in the direction of the arrow A. The coupling member 43 will, of course, rotate in the same direction as the drive shaft and cause the coupling cam surface 67 to bear against the roller 58. This will move the coupling member 43 in the direction of the clutch plate 39 attached to the driven shaft 23. The extent of longitudinal movement of the coupling member is limited by the clutch plate 39. Once the coupling member engages the clutch plate the two collars 55, 65 and the coil spring 63 will rotate with the coupling member. Thus, the driven shaft 23 will be rotated in the same direction as the coupling member and drive shaft. This will cause the reel drive shaft 7 to rotate in the direction of the arrow B so that the reel 17 mounted thereon will function as a take-up reel for the film 3. It will be noted, in this case, that the clutch plate 41 attached to the driven sleeve 25 is not engaged with the coupling member 43 so that the sleeve, the other reel driven shaft 9 and the reel 19 will be free to rotate.

If, however, the direction of rotation of the drive shaft 7 is reversed, as shown by the arrow C in Figure 3 of the drawing, the coupling member 43 will again rotate with the drive shaft. The clutch plate 39 will not be driven by the coupling member since the teeth on these two members are arranged to drive the clutch plate only in one direction, and the coupling member will be moved away from the clutch plate 39 by the action of the stud 57 and roller 58. As shown particularly in Figure 4, the cam surface 69 of the coupling member provided by the slot 53 will bear against the roller 58. The stud and roller being held stationary momentarily by friction between the collar 55 and the wall surface 59 will move the coupling member 43 into engagement with the clutch plate 41 secured to the sleeve 25. Thus, the sleeve will be driven simultaneously with the drive shaft resulting in the reel shaft 9 and reel 19 being driven in the direction of the arrow D so that the reel 19 will function as the take-up reel while the reel 17 will be free to rotate and function as the storage reel.

From the foregoing description, it will be apparent that the present invention provides a simple drive mechanism whereby only one of two independently rotatable members will be driven when the drive shaft is rotated in either direction. In addition thereto, the present invention provides a novel arrangement whereby reversal of direction of rotation of the drive shaft will automatically shift the drive from one to the other rotatable member.

Although only a single embodiment of the present invention has been illustrated and described herein, it should be obvious to those persons skilled in the art that modifications and changes are possible within the spirit of the invention. For example, the apparatus bevel gears 21, 29, 33 may be arranged to drive the reel shafts 7, 9 in other directions than those indicated herein. Other changes of like nature will undoubtedly suggest themselves to those skilled in the art. Therefore, it is desired that the particular form of the present invention described herein shall be considered as illustrative and not as limiting.

What is claimed is:

1. A reversible drive mechanism comprising a support, two shafts journaled in said support and being mounted for independent rotation, two driven members journaled in said support, said driven members being coaxially mounted, one of said driven members comprising a shaft, the other of said driven members comprising a sleeve, means connecting each of said driven members respectively to individual ones of said first mentioned shafts for transmitting a driving force thereto, a drive shaft extending coaxially through said sleeve, said drive shaft being mounted for independent rotation with respect to said sleeve and adapted to be reversibly driven, means operative in response to a change in direction of rotation of said drive shaft for coupling said drive shaft to only one of said driven members upon rotation of said drive shaft in one direction, and for coupling said drive shaft to only the other of said driven members upon rotation of said drive shaft in the opposite direction, and spring biased friction means operatively connected between said last mentioned means and said support for effecting said directionally responsive coupling.

2. A reversible drive mechanism according to claim 1 and wherein said coupling means comprises two clutch plates, each of said clutch plates being secured to separate ones of said driven members, and a coupling member mounted on said drive shaft for rotation simultaneously therewith, said coupling member also being mounted for slidable movement longitudinally on said drive shaft and being disposed between said clutch plates.

STEWART L. ARENSBERG.

REFERENCES CITED

The following references are of record in the file of this patent:

UNITED STATES PATENTS

| Number | Name | Date |
|---|---|---|
| 392,610 | Hoffman | Nov. 13, 1888 |
| 579,217 | Boath | Mar. 23, 1897 |
| 709,847 | Creveling | Sept. 23, 1902 |
| 991,521 | Maize | May 9, 1911 |